United States Patent
Kelin et al.

(10) Patent No.: US 11,728,905 B2
(45) Date of Patent: Aug. 15, 2023

(54) METHOD AND SYSTEM FOR DIGITAL COMMUNICATION OVER AN ACOUSTIC CHANNEL

(71) Applicant: CUE Audio, LLC, Albany, TX (US)

(72) Inventors: Timur Kelin, Cambourne (GB); Jameson Rader, Las Vegas, NV (US)

(73) Assignee: Cue Audio, LLC, Albany, TX (US)

(*) Notice: Subject to any disclaimer, the term of this patent is extended or adjusted under 35 U.S.C. 154(b) by 86 days.

(21) Appl. No.: 17/063,551

(22) Filed: Oct. 5, 2020

(65) Prior Publication Data

US 2022/0109511 A1  Apr. 7, 2022

(51) Int. Cl.
*H04B 11/00* (2006.01)
*H04B 1/7105* (2011.01)
*H04B 1/7176* (2011.01)

(52) U.S. Cl.
CPC ......... *H04B 11/00* (2013.01); *H04B 1/71057* (2013.01); *H04B 1/7176* (2013.01)

(58) Field of Classification Search
CPC .. H04B 11/00; H04B 1/71057; H04B 1/7176; H04L 27/2628; H04L 27/263
See application file for complete search history.

(56) References Cited

U.S. PATENT DOCUMENTS

| | | | |
|---|---|---|---|
| 4,037,159 A | 7/1977 | Martin | |
| 10,169,985 B1 | 1/2019 | Rader | |
| 2002/0009125 A1* | 1/2002 | Shi | H04B 1/69 375/139 |
| 2007/0165727 A1* | 7/2007 | Fanson | H04L 27/2602 375/260 |
| 2009/0110033 A1* | 4/2009 | Shattil | H04L 1/04 375/147 |
| 2014/0269201 A1* | 9/2014 | Liu | H04B 13/02 367/131 |

(Continued)

FOREIGN PATENT DOCUMENTS

| | | | | |
|---|---|---|---|---|
| CN | 103944848 A | * | 7/2014 | |
| CN | 105490976 A | * | 4/2016 | ......... H04B 1/69 |
| EP | 3225037 B1 | * | 5/2019 | ......... H04R 3/005 |

OTHER PUBLICATIONS

S. Xing, G. Qiao and L. Ma, "A Blind Side Information Detection Method for Partial Transmitted Sequence Peak-to-Average Power Reduction Scheme in OFDM Underwater Acoustic Communication System," in IEEE Access, vol. 6, pp. 24128-24136, 2018 (Year: 2018).*

(Continued)

*Primary Examiner* — Sam K Ahn
*Assistant Examiner* — Amneet Singh
(74) *Attorney, Agent, or Firm* — Suiter Swantz pc llo

(57) ABSTRACT

A method for providing digital communication over an acoustic channel is disclosed. The method includes dividing an operating frequency band of the acoustic channel into multiple adjacent non-overlapping subbands of an equal bandwidth, selecting subbands based on a symbol to be transmitted, generating a signal with linear frequency modulation in each of the selected subbands, combining the signals with linear frequency modulation, and transmitting the combined signals to the acoustic channel through an acoustic system, wherein slopes of linear frequency modulation for the signals with linear frequency modulation are equal.

8 Claims, 12 Drawing Sheets

(56) References Cited

U.S. PATENT DOCUMENTS

2019/0266347 A1* 8/2019 Indukuri ............... H04W 12/30

OTHER PUBLICATIONS

Hyewon Lee et al., Chirp Signal-Based Aerial Acoustic Communication for Smart Devices, 2015 IEEE Conference on Computer Communications (INFOCOM), pp. 2407-2415, Apr. 26, 2015, Kowloon, Hong Kong.

* cited by examiner

METHOD AND SYSTEM FOR DIGITAL COMMUNICATION OVER AN ACOUSTIC CHANNEL

TECHNICAL FIELD

The present disclosure generally relates to communication systems and, more particularly, to the transmission of data over acoustic channels.

BACKGROUND

There is a desire to enhance entertainment events, such as sporting events, musical concerts and the like, with crowd interaction. One such way to provide improved crowd interaction is through the use of the individual computing devices (e.g., smartphones) carried by members of the crowd. Such an approach is described in U.S. Pat. No. 10,169,985, issued on Jan. 1, 2019, which is incorporated herein by reference in the entirety. In such applications, the data transmission is performed via an acoustic channel utilizing the voice user interface, such as a speaker and/or microphone of a smartphone, as a communication interface. Acoustic channels, especially in large indoor environments (e.g., large halls), are characterized by both low coherence bandwidth (severe frequency selectivity) and low coherence time (fast changes in time). In these channels, the acoustic signals exhibit frequent random temporal and spatial fluctuations in both amplitude and phase. Due to their tolerance for Doppler offsets and multipath fading linear frequency modulated signals with slope keying are widely used for data communications in the acoustic channels. Such an approach is discussed in Proceedings of the IEEE International Conference on Computer Communications (INFOCOM) IEEE, 2407-2415, which is incorporated herein by reference in the entirety. The spectral efficiency of such modulation schemes is low, and in the narrow inaudible frequency band of the acoustic channel these systems lack the throughput required to control more than one aspect of many electronic devices, such as a smartphone. Therefore, it is desirable to provide a system and method that cures the deficiencies of the previous approaches identified above.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

A method of transmitting data over the acoustic channel is disclosed. In one illustrative embodiment, the method may include: dividing operating frequency band of the acoustic channel into a plurality of adjacent non-overlapping subbands of an equal bandwidth; selecting subbands on the basis of the symbol to be transmitted; generating a signal with linear frequency modulation in each of the selected subbands; combining the signals with linear frequency modulation; and transmitting the result of the combining to the acoustic channel through the acoustic system. The slopes of linear frequency modulation for the signals with linear frequency modulation may be equal.

A method of generating and transmitting the combined linear frequency modulated signal carrying data is disclosed. In one illustrative embodiment, the method may include: selecting a frequency-domain vector on the basis of a symbol; transforming the frequency-domain vector into a kernel vector; generating an time-domain vector by copying the kernel vector; multiplying the elements of the time-domain vector by a signal with linear frequency modulation; and transmitting the result of the multiplication to the acoustic channel through the acoustic system.

A method of receiving combined linear frequency modulated signal is disclosed. In one illustrative embodiment, the method may include: detecting of time of arrival and slope of the combined linear frequency modulated signal; generating heterodyne signal with linear frequency modulation; multiplying the received combined linear frequency modulated signal by the heterodyne signal with linear frequency modulation; splitting frequency band of the result of the multiplication into subbands; estimating of an energy parameter for a subband; and detecting a symbol on the basis of energy parameters. The start of the heterodyne signal with linear frequency modulation is selected on the basis of the detected time of arrival of the combined linear frequency modulated signal, and the slope of the heterodyne signal with linear frequency modulation is selected on the basis of the detected slope of the combined linear frequency modulated signal.

A method of detecting of time of arrival and slope of the combined linear frequency modulated signal is disclosed. In one illustrative embodiment, the method may include: delaying the received signal by time corresponding to the length of kernel vector; generating an offset signal with frequency corresponding to the slope hypothesis of the combined linear frequency modulated signal and the length of the kernel vector; multiplying the received signal, the delayed received signal and the offset signal; integrating the results of the multiplication over time; computing an energy parameter of the integration result; and detecting of time of arrival and slope of the combined linear frequency modulated signal on the basis of the energy parameter.

An acoustic communication system is disclosed. In one illustrative embodiment, the system includes a transmitter and a receiver. In another illustrative embodiment, the receiver includes an acoustic sensor configured to receive an acoustic signal from the transmitter. In another illustrative embodiment, the receiver includes an alignment delay line. In another illustrative embodiment, the receiver includes a signal detector, wherein the signal detector and the alignment delay line are communicatively coupled to the acoustic sensor. In another illustrative embodiment, the receiver includes a signal generator configured to generate a linear frequency modulated signal, wherein the signal detector is configured to control the signal generator. In another illustrative embodiment, the receiver includes a multiplier communicatively coupled to the signal generator and the alignment delay line. In another illustrative embodiment, the receiver includes a signal buffer communicatively coupled to the multiplier and configured to receive and store a resulting signal from the multiplier. In another illustrative embodiment, the receiver includes a Fast Fourier Transform block communicatively coupled to the signal buffer and configured to receive one or more signals from the buffer and transform the one or more signals into one or more frequency domain signals. In another illustrative embodiment, the receiver includes an energy parameter estimator communicatively coupled to the Fast Fourier Transform block, wherein the energy parameter estimator is configured to process the one or more frequency domain signals from the Fast Fourier transform block. In another illustrative embodiment, the receiver includes a symbol detector communicatively coupled to the energy parameter estimator, wherein the symbol detector is configured to identify a received symbol.

In one illustrative embodiment, the transmitter includes a subband mapper. In another illustrative embodiment, the transmitter includes a symbol counter. In another illustrative embodiment, the transmitter includes a plurality of generators, wherein each generator is communicatively coupled to the subband mapper and the symbol counter, wherein the plurality of generators is configured to generate a plurality of linear frequency modulated signals based on a plurality of signals received from the subband mapper. In another illustrative embodiment, the transmitter includes a combiner communicatively coupled to each of the plurality of generators, wherein the combiner is configured to combine the plurality of linear frequency modulated signals from the plurality of generators. In another illustrative embodiment, the transmitter includes an acoustic system communicatively couple to the combiner, wherein the combiner is configured to transmit a combination of the linear frequency modulated signals for transmission to the receiver.

In one illustrative embodiment, the transmitter includes a frequency-domain vector mapper. In another illustrative embodiment, the transmitter includes a symbol counter. In another illustrative embodiment, the transmitter includes an Inverse Fast Fourier Transform block, wherein the Inverse Fast Fourier Transform block is communicatively coupled to the frequency-domain vector mapper, wherein the Inverse Fast Fourier Transform block is configured to generate a kernel vector based on one or more signals received from the frequency-domain vector mapper. In another illustrative embodiment, the transmitter includes a plurality of cyclic shifters communicatively coupled to the Inverse Fast Fourier Transform block, wherein the plurality of cyclic shifters is configured to shift each of the components of the kernel vector. In another illustrative embodiment, the transmitter includes a plurality of copying blocks, wherein each copying block is communicatively coupled to a cyclic shifter of the plurality of cyclic shifters, wherein each copying block repeatedly copies the output from a respective cyclic shifter. In another illustrative embodiment, the transmitter includes a generator communicatively coupled to the symbol counter, wherein the generator is configured to generate a linear frequency modulated signal. In another illustrative embodiment, the transmitter includes a windowing function generator. In another illustrative embodiment, the transmitter includes a plurality of multipliers, wherein one or more of the multipliers are communicatively coupled to the plurality of copying blocks and configured to multiply an output from each of the copy blocks, wherein the plurality of multipliers includes an additional multiplier communicatively coupled to the generator and configured to multiply one or more signals from the generator by a windowing function from the windowing function generator. In another illustrative embodiment, the transmitter includes an acoustic system communicatively couple to the plurality of multipliers, wherein the plurality of multipliers is configured to transmit each signal from the multipliers to an acoustic system for transmission to the receiver.

Other features and advantages of the present disclosure will become apparent from the following description of various implementations which refer to the accompanying drawings. It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DESCRIPTION OF THE INVENTION

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the present disclosure. Reference will now be made in detail to the subject matter disclosed, which is illustrated in the accompanying drawings.

Referring generally to FIGS. 1-10, a system and method for digital communication over an acoustic channel is disclosed, in accordance with one or more embodiments of the present disclosure.

Figure 1A:
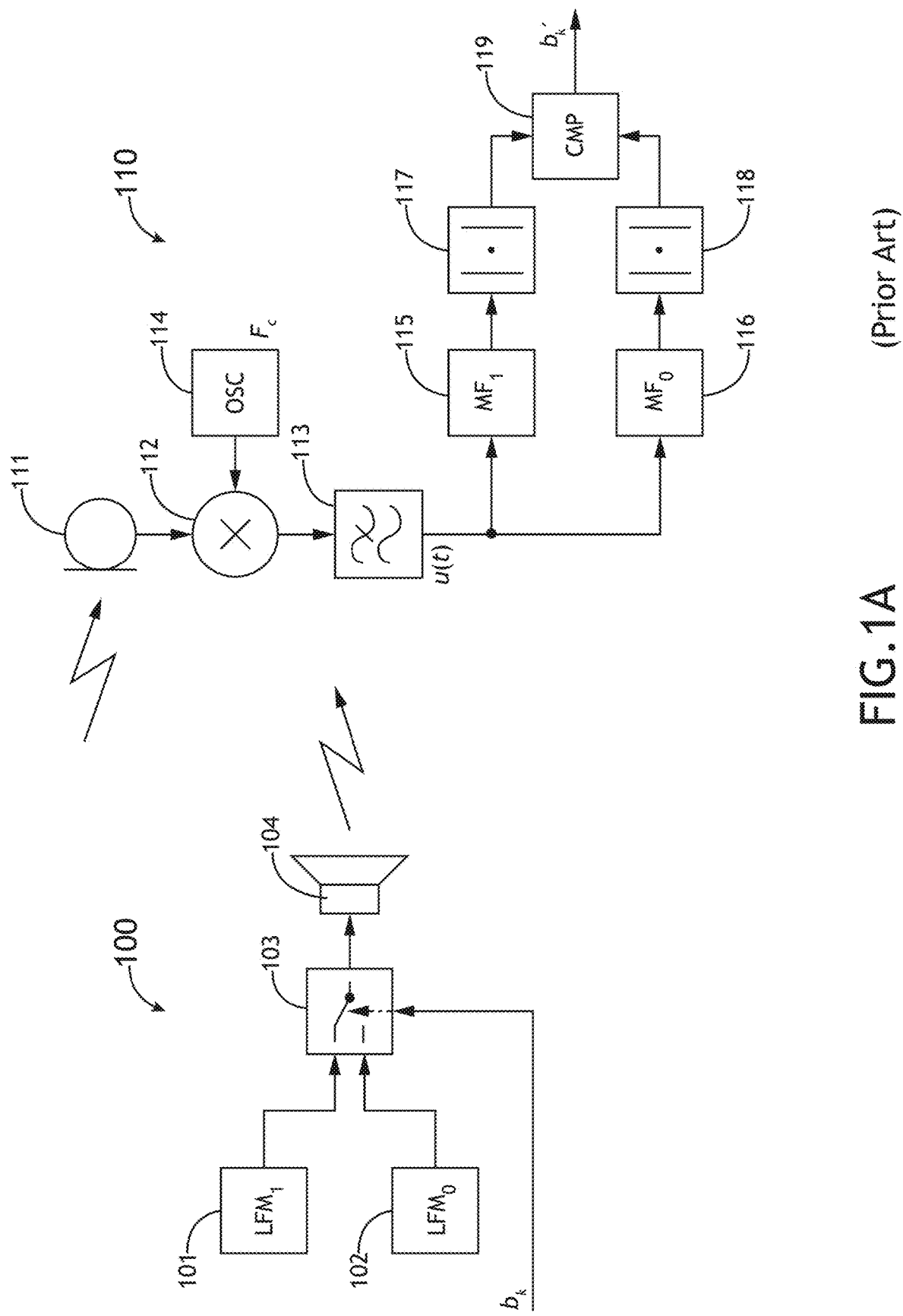
FIG. 1A is a block diagram showing a prior art communication system.

FIG. 1 illustrates a block diagram of a prior art digital communication system comprising a transmitter 100 and a receiver 110. Such a digital communication system is described in Proceedings of the IEEE International Conference on Computer Communications (INFOCOM) IEEE, 2407-2415, incorporated by reference above, and U.S. Pat. No. 4,037,159 issued on Jul. 19, 1977, which is herein incorporated by reference in the entirety. Prior art transmitter 100 includes a generator of the linear frequency modulated (LFM) signal, which corresponds to symbol "1" 101 and a generator of the linear frequency modulated (LFM) signal which corresponds to symbol "0" 102. The linear frequency modulated signals generated by the generators 101 and 102 span across the operating frequency band of the acoustic channel and have different slopes of the linear frequency modulation. The outputs of both generators 101 and 102 are connected to the multiplexer 103, which is controlled by a binary data symbol $b_k$ from transmitting data terminal equipment. The output of the multiplexer 103 is connected to an acoustic system 104.

A method of transmission by the transmitter 100 of the prior art communication system typically includes the following steps: generating of the linear frequency modulated signal which corresponds to symbol "1" with the generator 101; generating of the linear frequency modulated signal which corresponds to symbol "0" with the generator 102; performing slope keying by selecting the linear frequency modulated signal which corresponds to the binary symbol $b_k$ to be transmitted with the multiplexer 103; and transmitting the result of the selection to the acoustic channel through the acoustic system 104.

Prior art receiver 110 includes a microphone 111, which is connected to the first input of a mixer 112. The second input of the mixer 112 is connected to the output of a local oscillator (OSC) 114 and the output of the mixer 112 is connected to a lowpass filter 113. The output of the lowpass filter 113 is connected to the input of the matched filter (MF) which corresponds to symbol "1" 115 and to the input of the matched filter (MF) which corresponds to symbol "0" 116. The outputs of the matched filters 115 and 116 are connected to the inputs of estimators of energy parameter 117 and 118 respectively. The outputs of the estimators of energy parameter 117 and 118 are connected respectively to the first and the second inputs of a comparator (CMP) 119, and from the output of the comparator 119 the estimation of the received binary symbol $b'_k$ is passed on to receiving data terminal equipment.

A method of receiving by the receiver 110 of the prior art communication system typically includes the following steps: receiving the acoustic signal with the microphone 111; converting operating frequency band of the acoustic channel to baseband with the mixer 112, the local oscillator 114 and the lowpass filter 113. The baseband signal u(t) is then processed with the matched filters 115 and 116 which perform compression of a pulse with linear frequency modulation. The energy parameter like amplitude or power is then estimated for the output of the matched filters 115 and 116 by the estimators of energy parameter 117 and 118 respectively. The energy parameters are then compared by the comparator 119 which produces the estimation of the received binary symbol k to receiving data terminal equipment.

There are many practical cases when the spectral efficiency of the prior art system is insufficient and in the narrow inaudible frequency band of the acoustic channel such systems lack the throughput required to control more than one aspect of the smartphone. According to Proceedings of the IEEE International Conference on Computer Communications (INFOCOM) IEEE, 2407-2415, the spectral efficiency of the prior art acoustic communication system is 5.8 bps/kHz.

In contrast, a primary advantage provided by system and methods of digital communication over acoustic channel in accordance with the embodiments of the present disclosure is the increased spectral efficiency. Such an advantage may be achieved by the utilization of the combined linear frequency modulated signal for carrying data and the corresponding processing at the receiver. The spectral efficiency of the acoustic communication system built in accordance with the present disclosure is 17.7 bps/kHz in the signal propagation conditions described in Proceedings of the IEEE International Conference on Computer Communications (INFOCOM) IEEE, 2407-2415.

Another feature of the communication system of the present disclosure is the use of cyclic shift diversity to decorrelate the combined linear frequency modulated signals transmitted from spaced acoustic systems in order to alleviate undesirable beamforming effects. This allows to achieve higher acoustic field intensity and uniformity, and as a result to increase the operating distance of the acoustic communication system.

Figure 1B:
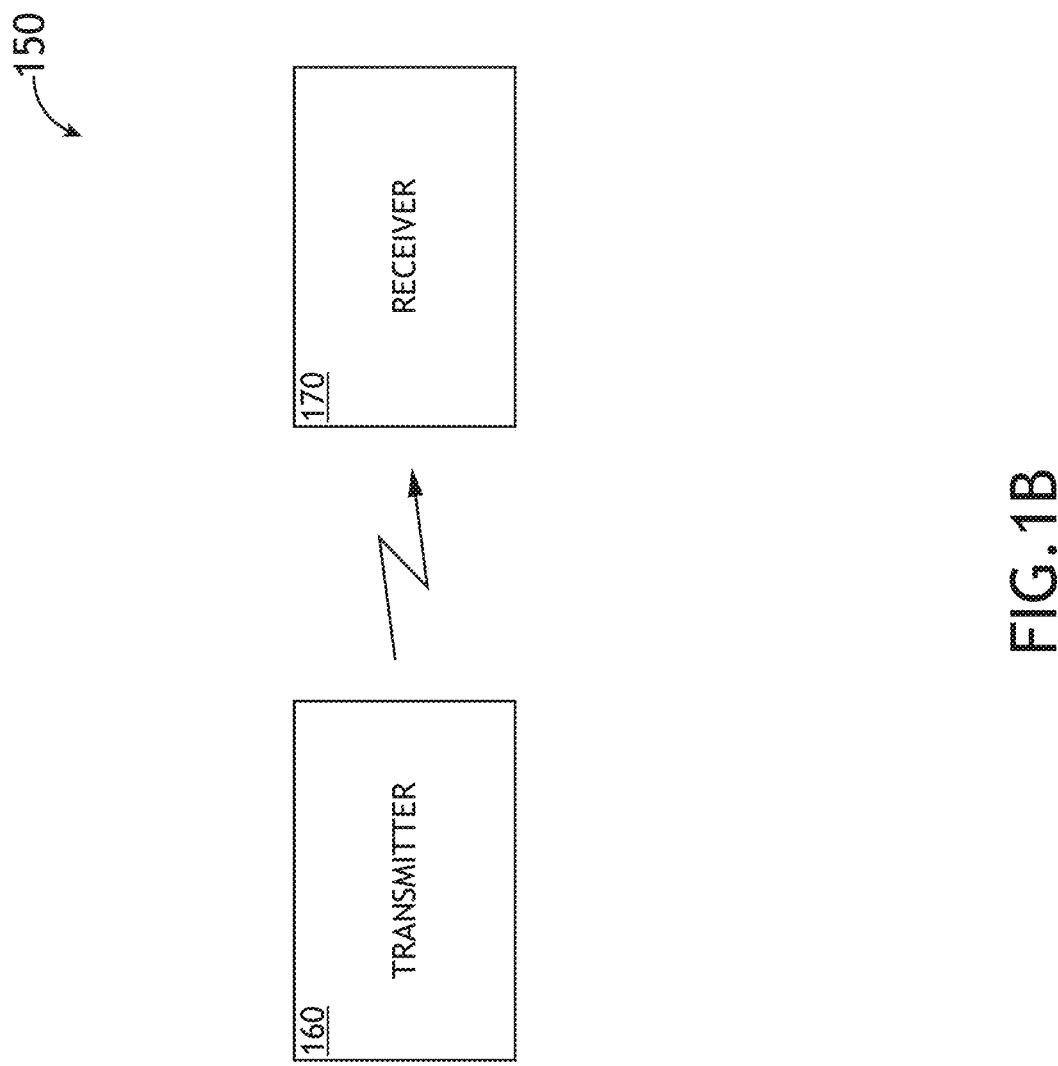
FIG. 1B is a conceptual view of an acoustic communication system, in accordance with one or more embodiments of the present disclosure.

FIG. 1B illustrates a conceptual view of an acoustic communication system 150, in accordance with one or more embodiments of the present disclosure. In one embodiment, the acoustic communication system 150 includes a transmitter 160 and a receiver 170.

Figure 2:
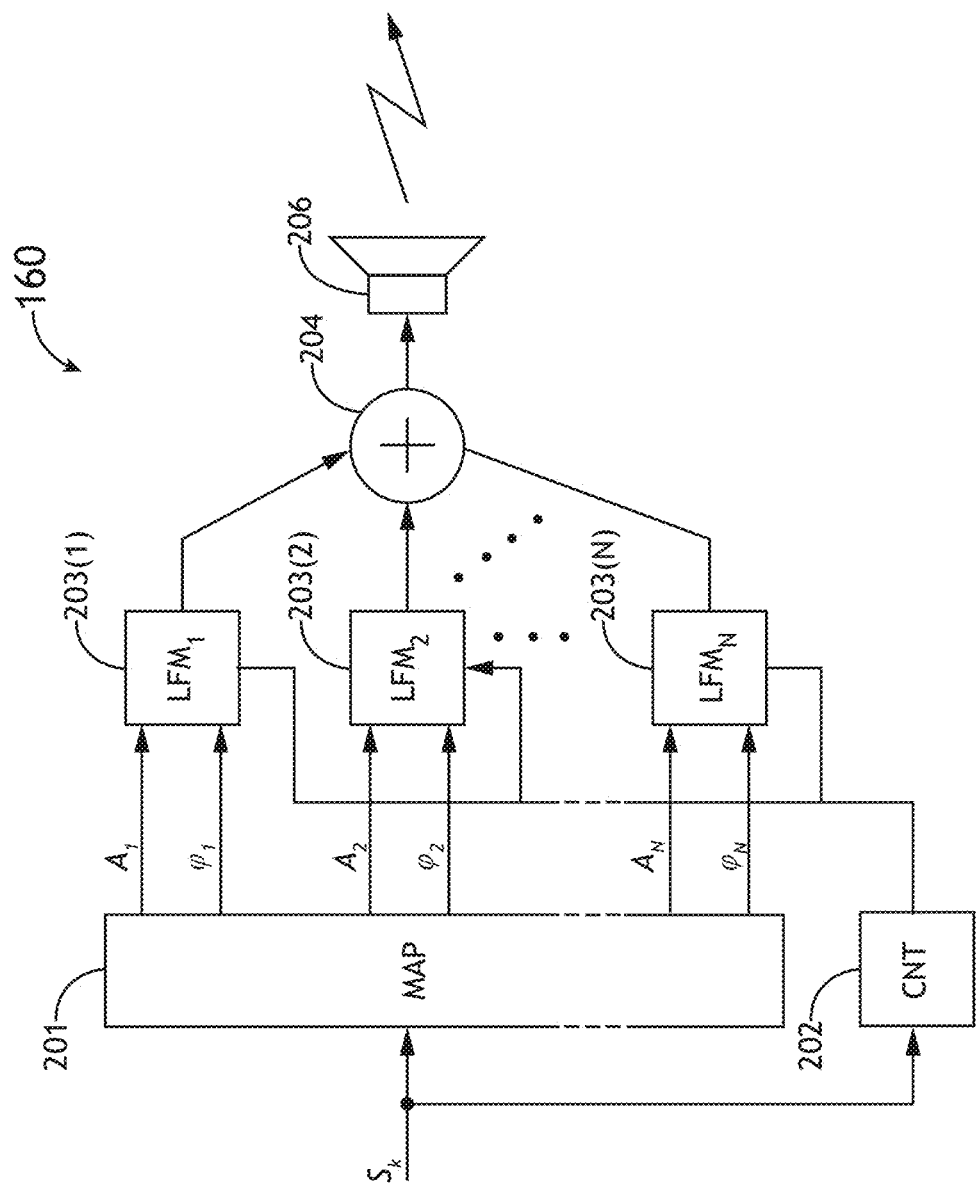
FIG. 2 is a block diagram depicting a transmitter of the acoustic communication system, in accordance with one or more embodiments of the present disclosure.

FIG. 2 illustrates a block diagram view of the transmitter 160 of the acoustic communication system 150, in accordance with one or more embodiments of the present disclosure. The transmitter 160 includes a subband mapper (MAP) 201, a symbol counter (CNT) 202, generators 203(1) . . . 203(N) of the linear frequency modulated signal (LFM), a combiner 204 and an acoustic system 206 (e.g., one or more speakers). In embodiments, each generator 203(1) . . . 203(N) is communicatively coupled to the subband mapper 201 and the symbol counter 202. In this regard, the generators 203(1) . . . 203(N) are configured to generate a set of linear frequency modulated signals $LFM_1 \ldots LFM_N$ based on the signals received from the subband mapper 201. In embodiments, the combiner 204 is communicatively coupled to each of the generators 203(1) . . . 203(N). The combiner 204 may be configured to combine the linear frequency modulated signals $LFM_1 \ldots LFM_N$ from the generators 203(1) . . . 203(N). In embodiments, the acoustic system 206 is communicatively coupled to the combiner 204. The combiner 204 is configured to transmit a combination of the linear frequency modulated signals $LFM_1 \ldots LFM_N$ to the acoustic system 206 for transmission to the receiver 170.

In embodiments, data symbol $S_k$ from transmitting data terminal equipment arrives to the input of the subband mapper (MAP) 201 which maps the value of the symbol $S_k$ into the set of active subbands. The total number of subbands N for the operating frequency band of the acoustic channel may be selected on the basis of the bandwidth of the operating frequency band, the characteristics of the frequency selective fading and/or the range of the frequency offsets which may be present in the acoustic channel. The subbands are adjacent, non-overlapping and having equal bandwidth, i.e. for nth subband n=1 . . . N the lower and upper frequencies are respectively:

$$f_n^{lo} = F^{lo} + [(F^{up} - F^{lo})/N] \cdot (n-1),$$

$$f_n^{up} = F^{lo} + [(F^{up} - F^{lo})/N] \cdot n \qquad \text{Eq. 1}$$

where $F^{lo}$ and $F^{up}$ are respectively the lower and upper frequencies of the operating frequency band of the acoustic channel.

The set of active subbands may consist of a fixed number M of subbands, where M<N. In this case, the size of the alphabet for data symbols $S_k$ is $$\binom{N}{M},$$

i.e. $S_k$ may take values in the range $$\left[0, \binom{N}{M}-1\right].$$

The fixed subset of subbands, which are always active regardless of the symbol value and used for frequency offset estimation, may be included into the set of active subbands. In another embodiment, a synchronization symbol may be mapped into a dedicated set of active subbands.

In embodiments, in each active subband a linear frequency modulated signal is generated by the generators (LFM) 203(1) ... 203(N) of the linear frequency modulated signal. The active generators may be selected with the control signals from the subband mapper (MAP) 201. The linear frequency modulated signals may all have one slope. To mitigate intersymbol interference, the slope can differ for the symbols adjacent in time. For example, if for symbol $S_k$ the slope is $\eta_0 = +\mu$ Hz/s, then for symbol $S_{k+1}$ the slope is $\eta_1 = -\mu$ Hz/s. In this case, the acoustic channel response for the symbol $S_k$ is loosely correlated with the linear frequency modulated signals expected in the time interval of the symbol $S_{k+1}$. This allows to reduce the duration of idle gaps between the symbol transmission intervals. The slope of the linear frequency modulated signals may be controlled by the symbol counter (CNT) 202.

The linear frequency modulated signals may then be added together in the combiner 204. In embodiments, this combination may be further combined with an audible signal. Then, the resulting combination may be transmitted to the acoustic channel through the acoustic system 206.

In embodiments, the amplitudes of the linear frequency modulated signals in different subbands may be selected to compensate for the nonuniform frequency response of the acoustic system 206 within the operating frequency band of the communication system 150. Such a configuration provides for increased operating distance of the communication system 150.

In embodiments, the initial phases of the linear frequency modulated signals in the active subbands may be selected to minimize peak-to-average power ratio of the combination. This embodiment provides for the mitigation of the distortion due to the limited dynamic range of the acoustic system 206. In turn, this allows the average output power to be maintained at a higher level, thereby increasing the operating distance of the communication system 150.

Figure 3:
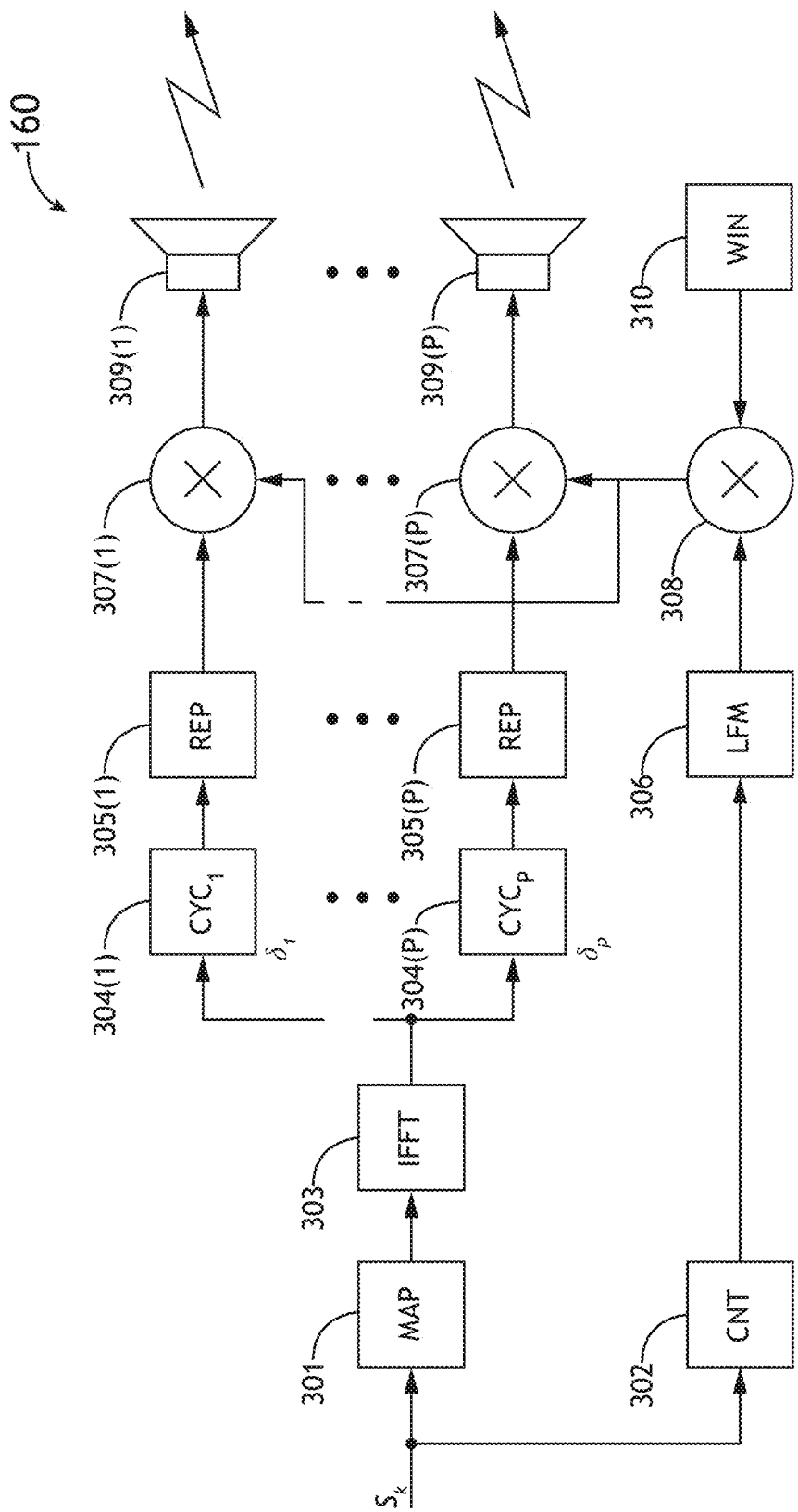
FIG. 3 is a block diagram depicting a transmitter of the acoustic communication system, in accordance with one or more alternative embodiments of the present disclosure.

FIG. 3 illustrates a block diagram view of the transmitter 160 of the acoustic communication system 150, in accordance with one or more alternative embodiments of the present disclosure. In this embodiment, the transmitter 160 includes a frequency-domain vector mapper (MAP) 301, a symbol counter (CNT) 302, an Inverse Fast Fourier Transform block (IFFT) 303, cyclic shifters (CYC) 304(1) ... 304(P), copying blocks (REP) 305(1) ... 305(P), a generator of a linear frequency modulated signal (LFM) 306, multipliers 307(1) ... 307(P) and 308, spaced acoustic systems 309(1) ... 309(P), and a windowing function generator (WIN) 310.

In embodiments, the Inverse Fast Fourier Transform block is communicatively coupled to the frequency-domain vector mapper. The Inverse Fast Fourier Transform block 303 may be configured to generate a kernel vector based on one or more signals received from the frequency-domain vector mapper. In embodiments, the cyclic shifters 304(1) ... 304(P) are communicatively coupled to the Inverse Fast Fourier Transform block 303. The cyclic shifters 304(1) ... 304(P) are configured to shift each of the components of the kernel vector. In embodiments, each copying block 305(1) ... 305(P) is communicatively coupled to a cyclic shifter 304(1) ... 304(P). Each copying block 305(1) ... 305(P) may repeatedly copy the output from a respective cyclic shifter 304(1) ... 304(P). In embodiments, the generator is configured to generate a linear frequency modulated signal 306. In embodiments, one or more of the multipliers 307(1) ... 307(P) are communicatively coupled to the copying blocks 305(1) ... 305(P) and configured to multiply an output from each of the copy blocks 305(1) ... 305(P). In embodiments, an additional multiplier 308 is communicatively coupled to the generator 306 and configured to multiply one or more signals from the generator 306 by a windowing function from the windowing function generator 310. In embodiments, the multipliers 307(1) ... 307(P) are configured to transmit each signal from the multipliers 307(1) ... 307(P) to an acoustic system 309(1) ... 309(P) for transmission to the receiver 170.

In embodiments, data symbol $S_k$ from transmitting data terminal equipment arrives at the input of the subband mapper (MAP) 301, which maps the value of the symbol $S_k$ into the frequency domain vector. The set of non-zero elements of the frequency-domain vector correspond to the set of active subbands in which the linear frequency modulated signal is present for the current symbol interval. The number of the elements of the frequency-domain vector which may potentially take non-zero values corresponds to the total number of subbands N.

In embodiments, the modulus of the non-zero elements of the frequency-domain vector may be selected to compensate for the nonuniform frequency response of the acoustic systems 309(1) ... 309(P) within the operating frequency band of the communication system. In embodiments, the argument of the non-zero elements of the frequency-domain vector may be selected to minimize peak-to-average power ratio of the signals transmitted from the acoustic systems 309(1) ... 309(P). Then, the frequency-domain vector may be transformed into the kernel vector by means of the Inverse Fast Fourier Transform block (IFFT) 303. The size of the kernel vector corresponds to the time interval $T_0$. In embodiments, the kernel vector is further shifted with the cyclic shifters (CYC) 304(1) ... 304(P) by the values $\delta_1 \ldots \delta_P$ respectively, thereby providing cyclic shift diversity to decorrelate the signals transmitted from the spaced acoustic systems 309(1) ... 309(P). This alleviates undesirable beamforming effects, resulting in higher acoustic field intensity and uniformity. Another approach to the implementation of the cyclic shift involves the frequency dependent phase offsets for the elements of the frequency-domain vector, which includes an Inverse Fast Fourier Transform block for each value of the cyclic shift $\delta_p$, where p=1 ... P.

In embodiments, each vector from the output of the cyclic shifters (CYC) 304(1) ... 304(P) is then repeatedly copied by the copying blocks (REP) 305(1) . . . 305(P). It is noted that the size of the resulting time-domain vectors correspond to the duration of the symbol interval $T_S$, i.e. $T_S = R \cdot T_0$ where $R \geq 2$.

In embodiments, the resulting time-domain vectors are then multiplied with the multipliers 307(1) . . . 307(P) by the linear frequency modulated signal generated by the generator (LFM) 306. Prior to this multiplication, the signal from the generator (LFM) 306 may be multiplied by means of the multiplier 308 by the windowing function generated by the windowing function generator (WIN) 310 to reduce the transient response of the acoustic systems 309(1) . . . 309(P) at the start and at the end of a symbol interval. Tapered cosine windowing function may be used.

The slope of the linear frequency modulated signal from the generator (LFM) 306 may be controlled by the symbol counter (CNT) 302 to reduce the correlation between the linear frequency modulated signals in the adjacent symbol intervals and thus to mitigate structured intersymbol interference caused by the acoustic channel response.

In embodiments, the resulting combined linear frequency modulated signals may be further combined with an audible signal for each of the spaced acoustic systems 309(1) . . . 309(P). Then the resulting combination is transmitted to the acoustic channel through the spaced acoustic systems 309(1) . . . 309(P).

Figure 4:
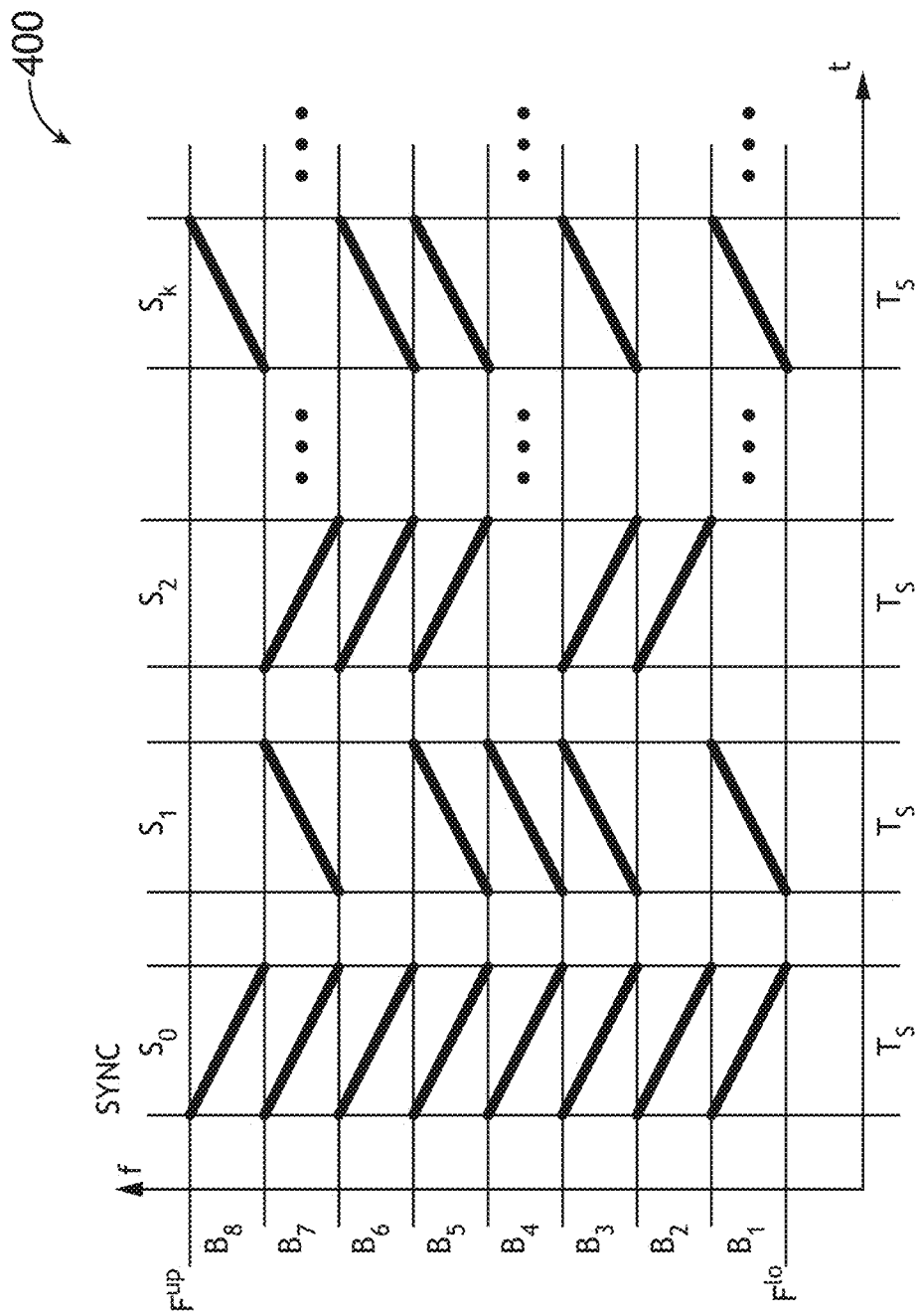
FIG. 4 is a spectrogram generated at the output of the transmitter of FIG. 1 or the transmitter of FIG. 2, in accordance with one or more embodiments of the present disclosure.

FIG. 4 is a spectrogram 400 generated at the output of the transmitter 160 (illustrated in FIG. 2 or FIG. 3), in accordance with one or more embodiments of the present disclosure.

In embodiments, the operating frequency band of the acoustic channel of the transmitter 160, which operation is illustrated by the spectrogram 400, maybe divided into N=8 subbands $B_1$ . . . $B_8$. In embodiments, the first symbol $S_0$ in the transmitted sequence is a synchronization symbol which has all 8 subbands active. Linear frequency modulated signals with negative slope may be generated for this symbol interval $T_S$. Subsequent symbols $S_1$ . . . $S_k$ may be data symbols, which all have the number of active subbands M=5 out of N=8 and toggled slope signs of the linear frequency modulated signals. For this M and N the size of the alphabet for data symbols is $$\binom{8}{5} = 56.$$

It is noted that a data symbol may take a value in the range [0, 55].

Figure 5A:
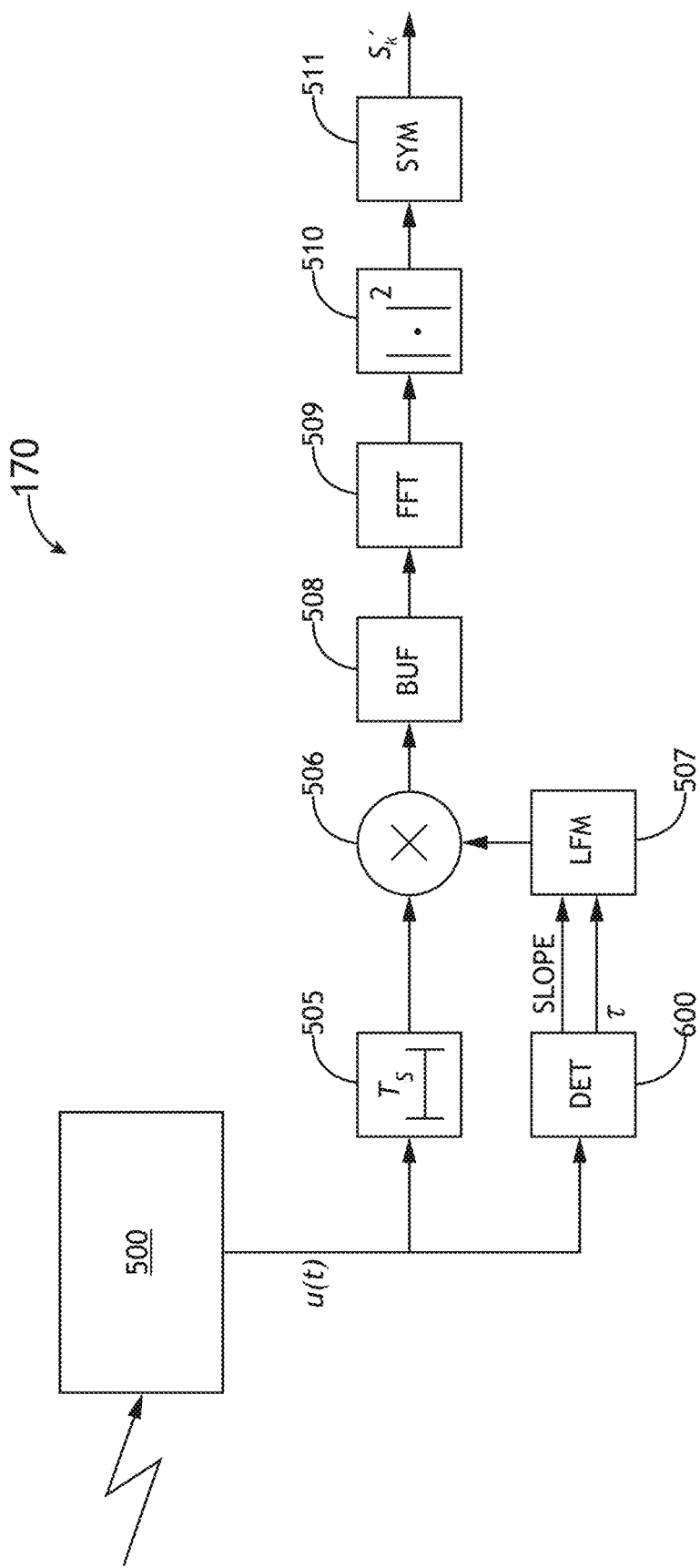
FIG. 5A is a block diagram depicting a receiver of the acoustic communication system, in accordance with one or more embodiments of the present disclosure.

FIG. 5A illustrates a block diagram view depicting a receiver 170 of the acoustic communication system 150, in accordance with one or more embodiments of the present disclosure. In embodiments, the receiver 170 includes an acoustic sensor 500, an alignment delay line 505, a signal detector (DET) 600, a multiplier 506, a generator of a linear frequency modulated signal (LFM) 507, a signal buffer (BUF) 508, a Fast Fourier Transform block (FFT) 509, an energy parameter estimator 510, and a symbol detector (SYM) 511.

The signal u(t) from the acoustic sensor 500 may then be passed to the signal detector 600, which detects the time of arrival r and slope of the combined linear frequency modulated signal. In embodiments, the signal u(t) is transmitted through the alignment delay line 505, which compensates for the latency of the detector 600 and is applied to the first input of the multiplier 506. The second input of the multiplier 506 may be connected to the output of the generator of a linear frequency modulated signal (LFM) 507.

Figure 5B:
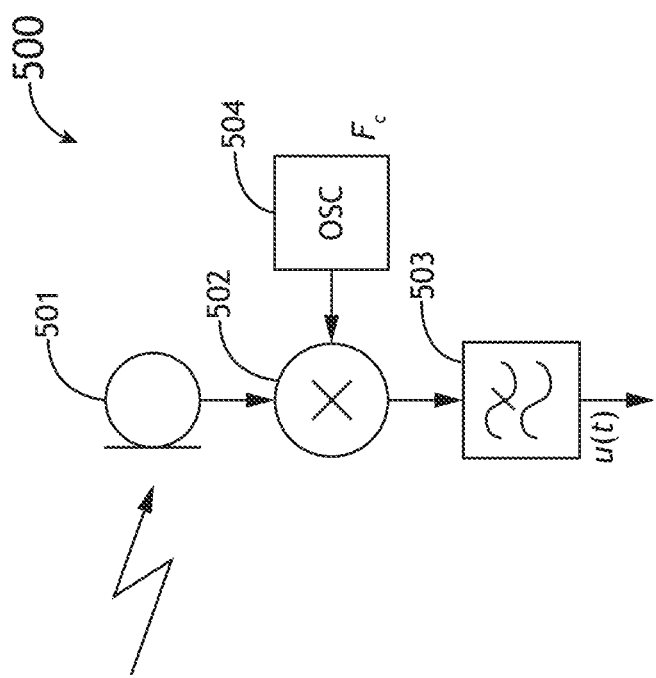
FIG. 5B is a block diagram depicting an acoustic sensor of the receiver, in accordance with one or more embodiments of the present disclosure.

FIG. 5B illustrates a block diagram view depicting an acoustic sensor 500 of the receiver 170, in accordance with one or more embodiments of the present disclosure. In embodiments, the acoustic sensor 500 includes a microphone 501, which is connected to the first input of a mixer 502. The second input of the mixer 502 may be connected to the output of a local oscillator (OSC) 504 and the output of the mixer 502 may be connected to a lowpass filter 503. In such implementation the signal from the acoustic channel may be received with the microphone 501. In embodiments, the operating frequency band of the acoustic channel is converted to baseband by the mixer 502, the local oscillator (OSC) 504 and the lowpass filter 503.

In embodiments, the signal detector 600 controls the generator (LFM) 507 such that the start of the linear frequency modulated signal from the generator (LFM) 507 corresponds to the detected time of arrival r of the combined linear frequency modulated signal. The slope of the linear frequency modulated signal from the generator (LFM) 507 may have the same modulus and the opposite sign of the detected slope of the combined linear frequency modulated signal. It is noted that multiplying by the multiplier 506 the combined linear frequency modulated signal by the linear frequency modulated signal with the negative slope from the generator (LFM) 507 results in zero slope for the signal at the output of the multiplier 506. In this regard, this operation eliminates common linear frequency modulation from the combination, thereby giving the estimation of the time-domain vector generated in the transmitter 160.

It is noted that in the ideal case the baseband signal at the output of the alignment delay line 505u'(t), or the combined linear frequency modulated signal, is expressed as:

$$u'(t) = \sum_{b \in B_a} A_b e^{j[2\pi(f_b t + \eta t^2/2) + \varphi_b]} \qquad \text{Eq. 2}$$

where $B_a$ is a set of active subbands; $A_b$, $f_v$, and $\varphi_b$ are respectively amplitude, initial frequency and initial phase of the linear frequency modulated signal in the active subband b; and η is the slope common to each of the linear frequency modulated signals, where:

$$f_b^{lo} \leq f_b + \eta t \leq f_b^{up} \text{ for } 0 \leq t < T_S. \qquad \text{Eq. 3}$$

The signal from the generator (LFM) 507 in the case of the ideal detection of the time of arrival and slope of the combined linear frequency modulated signal by the detector 600 may be expressed as follows:

$$g(t) = e^{-j\pi\eta t^2} \qquad \text{Eq. 4}$$

The signal at the output of the multiplier 506 may be expressed as follows:

$$u'(t) \cdot g(t) = \sum_{b \in B_a} A_b e^{j(2\pi f_b t + \varphi_b)} \qquad \text{Eq. 5}$$

In embodiments, the resulting signal from the output of multiplier 406 may be written into the signal buffer (BUF) 508, which is capable of storage a signal with the duration of symbol interval $T_S$. Upon the completion of the write operation, the Fourier transform may be performed on the contents of the signal buffer (BUF) 508 by the Fast Fourier Transform block (FFT) 509, which converts the signal into the frequency domain. The result of the Fourier Transform may then be processed by the energy parameter estimator 510. In embodiments, the output of the energy parameter estimator 510 contains the energy parameters like signal amplitude or power estimated for N subbands of the operating frequency band of the acoustic channel. It is noted that the estimation of the energy parameter is noncoherent. In this regard, the estimation of the energy parameter is insensitive to the phasing between the input signal, the oscillator (OSC) 504 and the generator (LFM) 507.

In embodiments, these energy parameters are then applied to the input of the symbol detector (SYM) 511, which determines the set of active subbands by Maximum Likelihood Estimation and makes the decision on the received symbol $S'_k$. The received symbol $S'_k$ may further be passed on to the receiving data terminal equipment.

Figure 6:
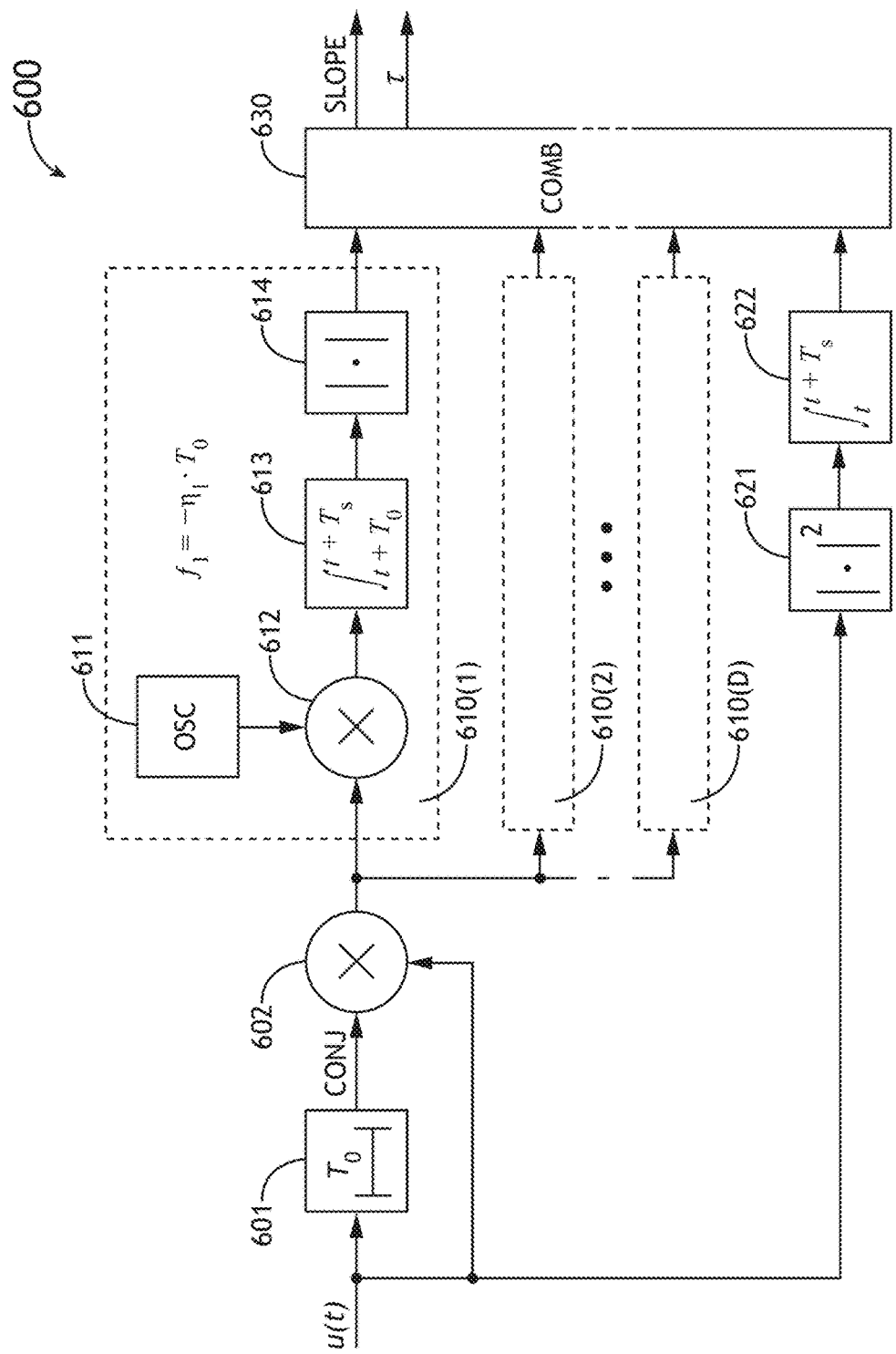
FIG. 6 is a block diagram depicting a signal detector of the receiver, in accordance with one or more embodiments of the present disclosure.

FIG. 6 is a block diagram view depicting the signal detector 600 of the receiver 170 of the acoustic communication system 150, in accordance with one or more embodiments of the present disclosure. In embodiments, the signal detector 600 includes a delay line 601, a multiplier 602, a set of processing blocks 610(1) . . . 610(D), a power estimator 621, an integrator 622 and a combiner (COMB) 630. Each of the processing blocks 610(1) . . . 610(D) includes an oscillator (OSC) 611, a multiplier 612, an integrator 613 and an estimator of the energy parameter 614.

In embodiments, the baseband signal u(t) is applied to the first input of the multiplier 602 and also delayed with the delay line 601 by the time interval $T_0$, which corresponds to the size of the kernel vector. The conjugate of the delayed baseband signal from the output of the delay line 601 may be applied to the second input of the multiplier 602.

It is noted that if the ideal combined linear frequency modulated signal of duration $T_S$ is applied to the input of the detector 600, then the signal on the second input of the multiplier 602 up to phase ambiguity is a copy of the signal on the first input of the multiplier 602 provided that its frequency offset is compensated. The frequency offset is a function of the delay time interval $T_0$ and the slope of the combined linear frequency modulated signal. This is fulfilled because the baseband signal is a linear combination of linear frequency modulated signals and the structure of the time-domain vector is periodic with a period of $T_0$.

In embodiments, the compensation for the frequency offset is performed by the oscillator (OSC) 611 and the multiplier 612. In this regard, the signal from the output of the multiplier 602 is applied to the first input of the multiplier 612, while the output of the oscillator (OSC) 611 is connected to the second input of the multiplier 612. The frequency of the oscillator in the processing block 610(d) from the set of the processing blocks 610(1) . . . 610(D) is $f_d = -\eta_d \cdot T_0$. As such, the processing block 610(d) estimates the measure of likelihood for the single slope value $\eta_d$. In each of the processing blocks 610(1) . . . 610(D), the output of the multiplier 612 may be connected to the input of the integrator 613, and the output of the integrator 613 may be connected to the input of the estimator of the energy parameter 614. Thus, the signal at the output of the estimator 614 may be the absolute value of the cross correlation between the baseband signal delayed by $T_0$ and the baseband signal with compensated frequency offset $f_d$ on the time interval $[t+T_0, t+T_S)$. This absolute value represents the measure of likelihood for the presence of the combined linear frequency modulated signal having slope $\eta_d$ and duration $T_S$. It is noted the estimation of the energy parameter is noncoherent as its result is insensitive to the phasing between the input signal and the oscillator (OSC) 611.

In embodiments, the baseband signal u(t) is also applied to the input of the power estimator 621. The power estimator 621 and the integrator 622 may be connected in series. It is noted that such a path estimates the energy of the baseband signal u(t) on the duration of the symbol interval $[t, t+T_S)$.

In embodiments, the likelihood values from the output of the processing blocks 610(1) . . . 610(D) and the energy estimate from the integrator 622 are fed into the combiner (COMB) 630. COMB 630 may generate the decisions on the presence of the combined linear frequency modulated signal at time t and its slope from the set of hypothesis $\eta_1 \ldots \eta_D$. In this regard, COMB 630 selects the maximum value from the likelihood values and compares it with the threshold, which is the function of the energy estimate. It is noted that if the threshold is exceeded then the combined linear frequency modulated signal is considered to be present in the acoustic channel and its slope corresponds to the index of the maximum likelihood value.

Figure 7:
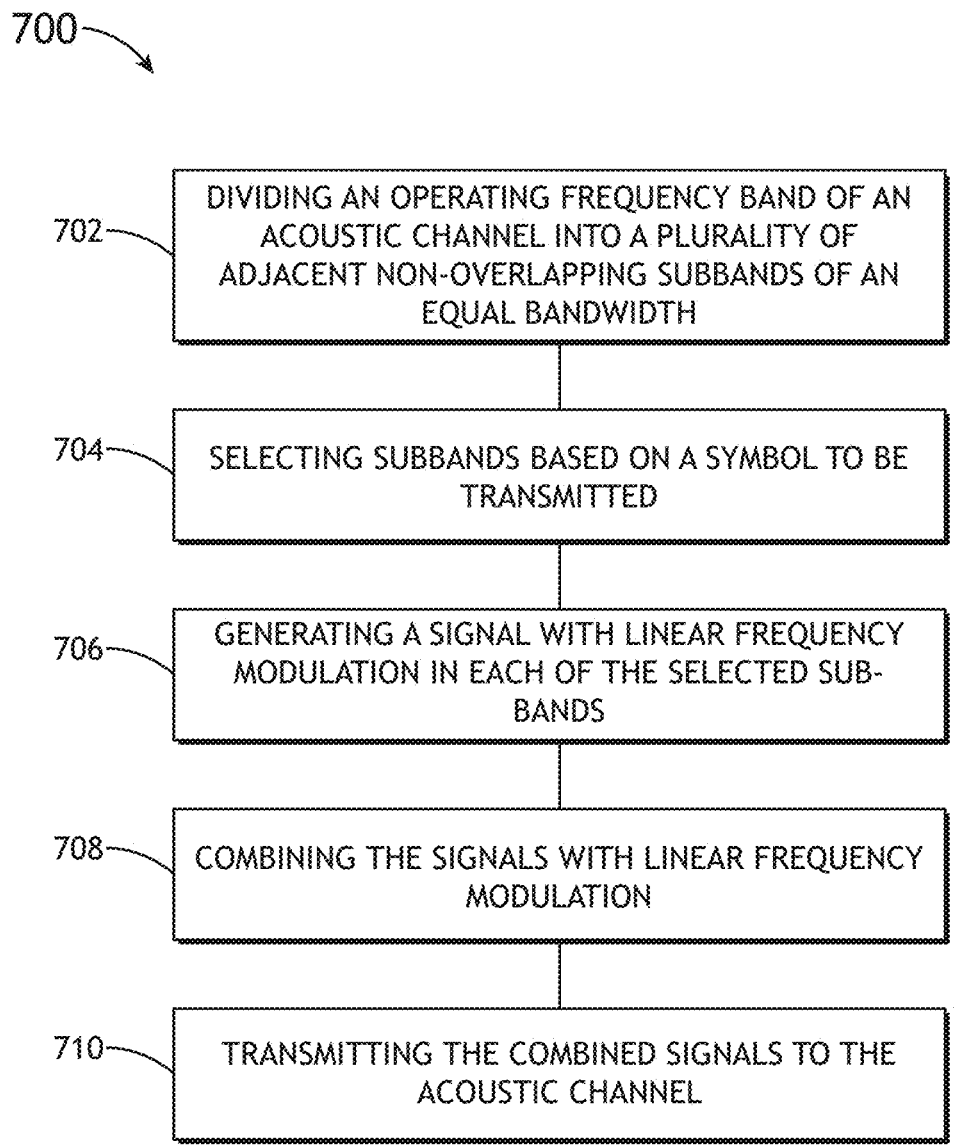
FIG. 7 illustrates a flow diagram depicting a method of transmitting data over an acoustic channel, in accordance with one or more embodiments of the present disclosure.

FIG. 7 illustrates a flow diagram depicting a method 700 for transmitting data over an acoustic channel, in accordance with one or more embodiments of the present disclosure.

In a step 702, an operating frequency band of the acoustic channel is divided into a plurality of adjacent non-overlapping subbands of an equal bandwidth. In a step 704, subbands are selected based on a symbol to be transmitted. In a step 706, a signal is generated with linear frequency modulation in each of the selected subbands. In a step 708, the signals are combined with linear frequency modulation. In a step 710, the combined signals are transmitted to the acoustic channel through an acoustic system, wherein the slopes of linear frequency modulation for the signals with linear frequency modulation are equal.

Figure 8:
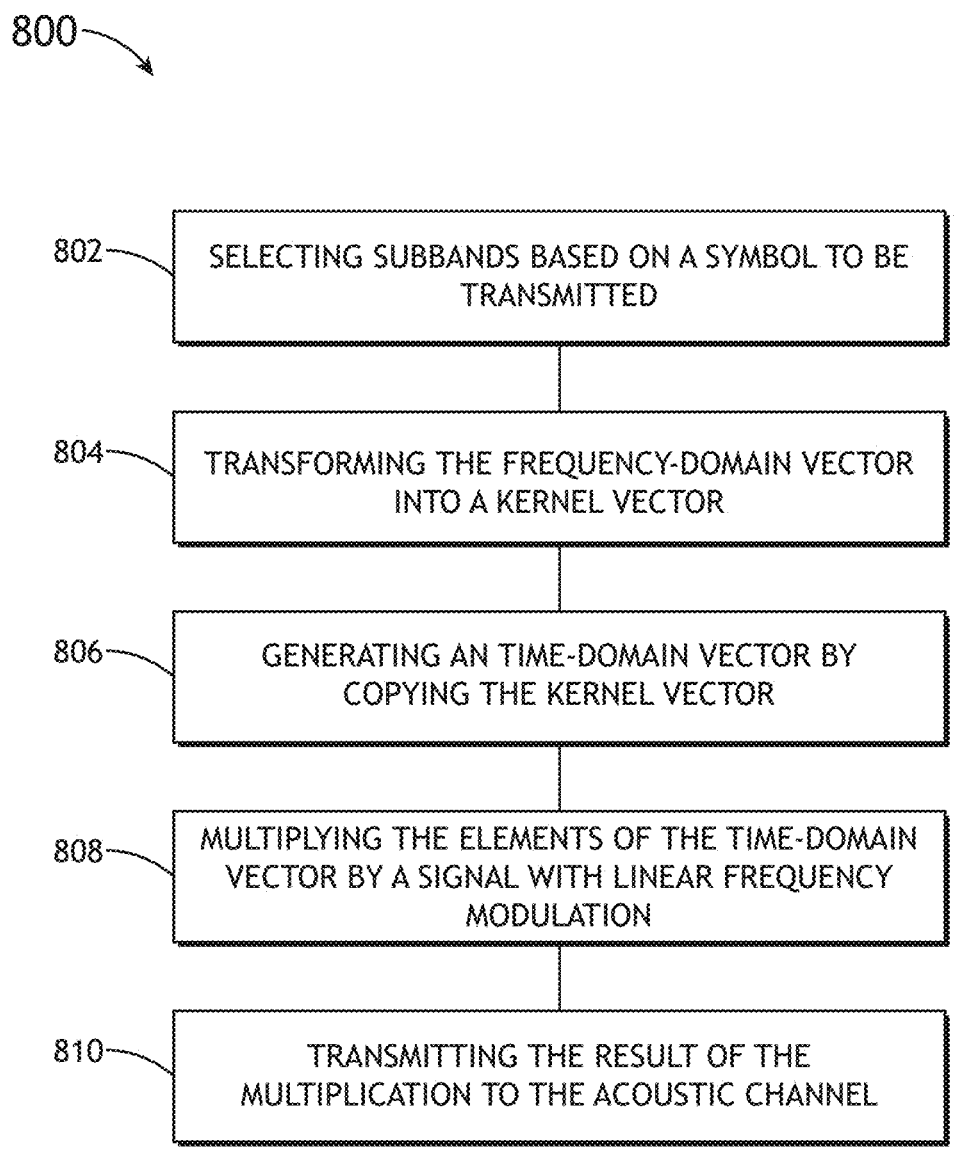
FIG. 8 illustrates a flow diagram depicting a method of generating and transmitting combined linear frequency modulated signal carrying data, in accordance with one or more embodiments of the present disclosure.

FIG. 8 illustrates a flow diagram depicting a method 800 for generating and transmitting combined linear frequency modulated signal carrying data, in accordance with one or more embodiments of the present disclosure.

In a step 802, a frequency-domain vector on the basis of a symbol is selected. In a step 804, the frequency-domain vector is transformed into a kernel vector. In a step 806, a time-domain vector is generated by copying the kernel vector. In a step 808, the elements of the time-domain vector are multiplied by a signal with linear frequency modulation. In a step 810, the result of the multiplication is transmitted to the acoustic channel through the acoustic system.

Figure 9:
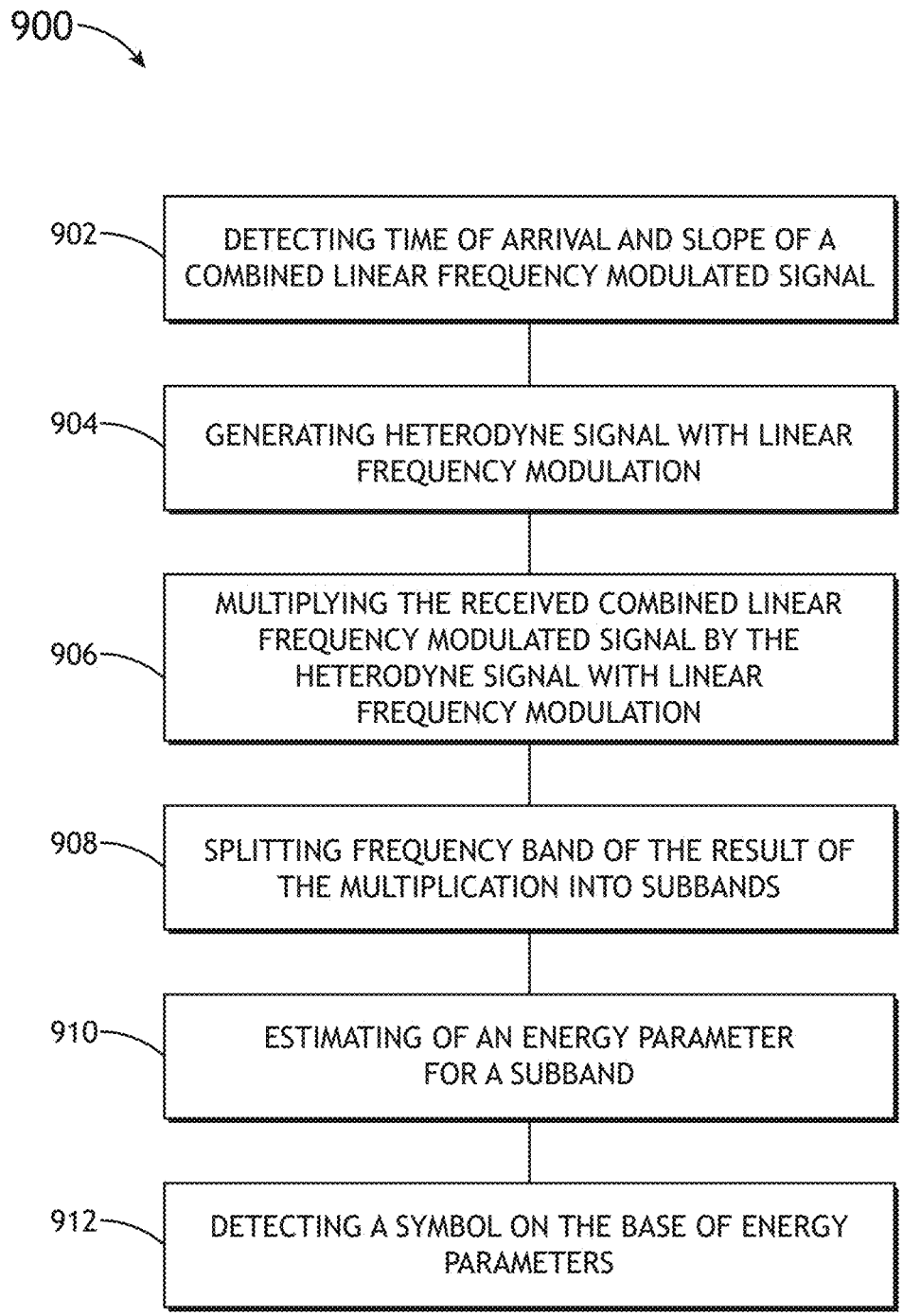
FIG. 9 illustrates a flow diagram depicting a method of receiving combined linear frequency modulated signal, in accordance with one or more embodiments of the present disclosure.

FIG. 9 illustrates a flow diagram depicting a method 900 for receiving combined linear frequency modulated signal, in accordance with one or more embodiments of the present disclosure.

In a step 902, time of arrival and slope of the combined linear frequency modulated signal are detected. In a step 904, a heterodyne signal is generated with linear frequency modulation. In a step 906, the received combined linear frequency modulated signal is multiplied by the heterodyne signal with linear frequency modulation. In a step 908, a frequency band of the result of the multiplication is split into subbands. In a step 910, an energy parameter is estimated for a subband. In a step 912, a symbol is detected on the basis of energy parameters, wherein the start of the heterodyne signal with linear frequency modulation is selected on the basis of the detected time of arrival of the combined linear frequency modulated signal, and the slope of the heterodyne signal with linear frequency modulation is a function of the detected slope of the combined linear frequency modulated signal.

Figure 10:
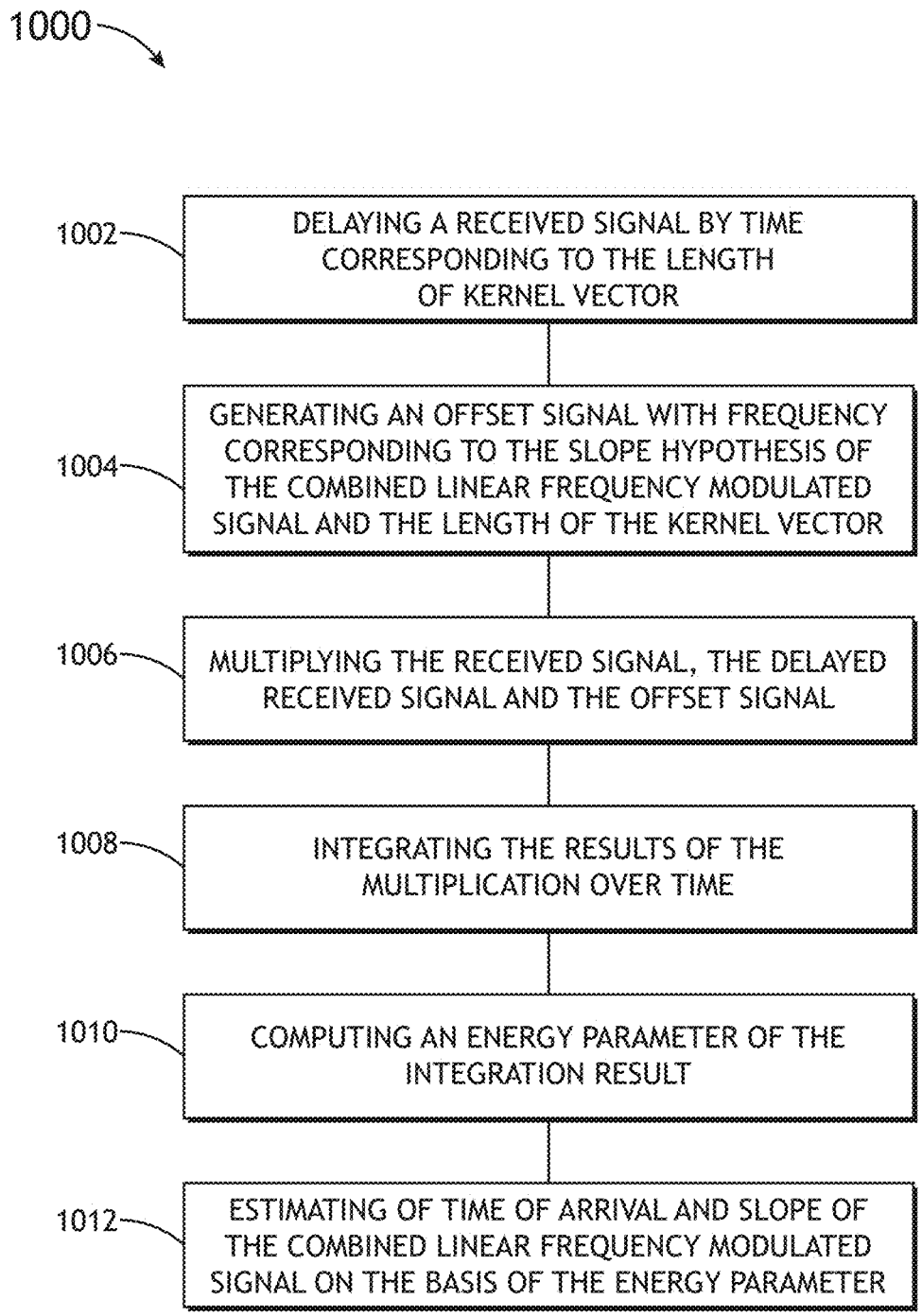
FIG. 10 illustrates a flow diagram depicting a method of detecting of time of arrival and slope of a combined linear frequency modulated signal, in accordance with one or more embodiments of the present disclosure

FIG. 10 illustrates a flow diagram depicting a method 1000 for detecting of time of arrival and slope of a combined linear frequency modulated signal, in accordance with one or more embodiments of the present disclosure.

In a step 1002, a received signal is delayed by time corresponding to a length of a kernel vector. In a step 1004, an offset signal is generated with frequency corresponding to a slope hypothesis of the combined linear frequency modulated signal and the length of the kernel vector. In a step 1006, the received signal, the delayed received signal and the offset signal are multiplied. In a step 1008, the results of the multiplication are integrated over time. In a step 1010, an energy parameter of the integration result is computed. In a step 1012, a time of arrival and slope of the combined linear frequency modulated signal is estimated on the basis of the energy parameter.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software may become significant) a design choice representing cost vs. efficiency tradeoffs. Those having skill in the art will appreciate that there are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that signal processing aspects of implementations will typically employ hardware, software, and/or firmware oriented to perform such processing.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device-detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively, or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed:

1. A method of generating and transmitting combined linear frequency modulated signal carrying data, comprising:
   selecting a frequency-domain vector on the basis of a symbol;
   transforming the frequency-domain vector into a kernel vector;
   generating a time-domain vector, wherein the generating the time-domain vector comprises cyclic shifting of the kernel vector using a plurality of cyclic shifters and repeatedly copying an output of a respective cyclic shifter of the plurality of cyclic shifters using a plurality of copying blocks;
   multiplying elements of the time-domain vector by a signal with linear frequency modulation; and
   transmitting the result of the multiplication to an acoustic channel through a plurality of acoustic systems of one or more electronic devices.

2. The method of claim 1, wherein a modulus of elements in the frequency-domain vector is selected to compensate for a frequency response of the acoustic system.

3. The method of claim 1, wherein an argument of elements in the frequency-domain vector is selected to minimize peak-to-average power ratio of the kernel vector.

4. The method of claim 1, wherein the transforming of the frequency-domain vector further comprises a phase offset for an element of the frequency-domain vector.

5. The method of claim 1, wherein the transforming of the frequency-domain vector is done by Inverse Fourier transform.

6. The method of claim 1, wherein a slope of linear frequency modulation for the signal with linear frequency modulation is controlled by a symbol index.

7. The method of claim 1, wherein the multiplying of the elements of the time-domain vector further comprises multiplication by windowing function.

8. The method of claim 1, wherein the transmitting of the result further comprises combining the result with an audible signal.

* * * * *